United States Patent [19]
Fischer

[11] Patent Number: 6,065,818
[45] Date of Patent: May 23, 2000

[54] RUBBER TRACK BELT WITH IMPROVED TRACTION AND DURABILITY

[75] Inventor: Keith Fischer, Roanoke, Ill.

[73] Assignee: Caterpillar, Inc., Peoria, Ill.

[21] Appl. No.: 09/109,612

[22] Filed: Jul. 2, 1998

[51] Int. Cl.$^7$ .................................................. B62D 55/24
[52] U.S. Cl. .......................... 305/179; 305/160; 305/165; 305/180; 305/191
[58] Field of Search ............................... 301/43; 305/157, 305/160, 165, 178, 179, 180, 191, 192; 152/209 P

[56] References Cited

U.S. PATENT DOCUMENTS

| | | | |
|---|---|---|---|
| 336,650 | 2/1886 | Kelly et al. ................................. | 301/43 |
| 781,573 | 1/1905 | Todd ........................................ | 301/43 |
| 1,852,954 | 4/1932 | Cloud ....................................... | 301/53 |
| 2,416,679 | 3/1947 | Curtis ...................................... | 180/9.46 |
| 2,461,150 | 2/1949 | Flynn et al. ............................. | 305/165 |
| 2,476,460 | 7/1949 | Smith ...................................... | 305/179 |
| 3,278,244 | 10/1966 | Deffenbaugh et al. .................... | 305/54 |
| 3,435,873 | 4/1969 | Weier ...................................... | 152/191 |
| 3,498,684 | 3/1970 | Hallaman ................................. | 305/178 |
| 3,509,955 | 5/1970 | Lichfield ................................. | 180/9.23 |
| 3,830,551 | 8/1974 | Masaoka et al. ........................ | 305/35 R |
| 3,937,529 | 2/1976 | Becker et al. ............................ | 305/54 |
| 4,026,608 | 5/1977 | Becker et al. ............................ | 305/54 |
| 4,094,557 | 6/1978 | Miller ...................................... | 305/54 |
| 4,383,718 | 5/1983 | Ragon ...................................... | 305/53 |
| 4,483,407 | 11/1984 | Iwamoto et al. ........................ | 180/6.54 |
| 4,846,091 | 7/1989 | Ives ......................................... | 305/178 |
| 4,906,054 | 3/1990 | Edwards et al. ........................ | 305/180 |
| 5,005,921 | 4/1991 | Edwards et al. ..................... | 305/35 EB |
| 5,005,922 | 4/1991 | Edwards et al. ..................... | 305/35 EB |
| 5,020,865 | 6/1991 | Edwards et al. ..................... | 305/35 EB |
| 5,211,609 | 5/1993 | Haines .................................... | 474/260 |
| 5,326,332 | 7/1994 | Bargfrede et al. ...................... | 474/249 |
| 5,390,985 | 2/1995 | Chandler ................................. | 301/43 |
| 5,494,125 | 2/1996 | Gustin et al. ............................ | 180/9.1 |
| 5,573,310 | 11/1996 | Rollinson ................................. | 301/43 |

FOREIGN PATENT DOCUMENTS 0 515 683 A1  2/1991  European Pat. Off. .

OTHER PUBLICATIONS

"Challenger 65D Agricultural Tractor", Caterpillar, 1995.
"Challenger 55 Agricultural Tractor", Caterpillar, 1997.

*Primary Examiner*—S. Joseph Morano
*Assistant Examiner*—Long Bae Nguyen
*Attorney, Agent, or Firm*—Maginot, Addison, Moore

[57] ABSTRACT

A track belt assembly includes an elastomeric track member which forms a closed loop. The elastomeric track member is advanced in a path of movement when a work machine is advanced in the forward direction of movement. The track belt assembly further includes a number of elastomeric tread bars mounted on an outer surface of the track member. A first cross section of each of the number of tread bars which is taken in a longitudinal direction which is oriented parallel to the forward direction of movement defines a leading terminal end point, a leading edge transition point, a trailing edge transition point, and a trailing terminal end point. The distance between the track member and each point of the first cross section which is interposed between the leading terminal end point and the leading edge transition point is smaller than the distance between the track member and the leading edge transition point. The distance between the track member and each point of the first cross section which is interposed between the trailing terminal end point and the trailing edge transition point is smaller than the distance between the track member and the trailing edge transition point. A leading longitudinal distance is defined between the leading terminal end point and the leading edge transition point. A trailing longitudinal distance is defined between the trailing terminal end point and the trailing edge transition point. The trailing longitudinal distance is greater than twice the leading longitudinal distance.

20 Claims, 8 Drawing Sheets

RUBBER TRACK BELT WITH IMPROVED TRACTION AND DURABILITY

TECHNICAL FIELD OF THE INVENTION

The present invention relates generally to a rubber track belt for an agricultural work machine, and more specifically to a rubber track belt with improved traction and durability.

BACKGROUND OF THE INVENTION

Rubber track belts are used to propel agricultural work machines. Agricultural work machines which employ rubber track belts have several advantages over conventional agricultural work machines which employ wheels. The primary advantage of rubber track belts is that track belts distribute the weight of the work machine over a larger area than tires. Distributing the weight of the work machine over a larger area gives the work machine better floatation, or the ability to resist sinking into soft ground. In addition, as the rubber track belts move over the loose soil, the rubber track belts compact the soil much less as compared to wheels used on similarly sized agricultural work machines. Reducing the amount that the soil is compacted increases the yield of crops grown in the field as crops grow better in less compacted soil.

In addition, agricultural work machines which use rubber track belts have better traction than wheel type work machines. Since the size of the contact area between the rubber track belt and the ground is much larger than the size of the contact area between a wheel and the ground, a larger number of traction members, known as tread bars, are in contact with the ground at any given time. The larger number of tread bars allows more friction to be produced between the rubber track belt and the ground than between a tire and the ground. The greater amount of friction produces less slippage between the ground and the work machine thereby allowing more power to be applied to moving the work machine. This additional power allows greater loads to be pulled by a work machine that uses the rubber track belt than similar work machines that use wheels.

However, a problem with rubber track belts that have heretofore been used is that voids, or areas of low density material, are created under the belt as the belt advances through dirt, or other soft ground. In particular, as the track belt advances, the leading edge of the tread bars are pushed forward and down into the dirt. As the tread bar is moved forward and down, the tread bar compacts the dirt in front of the tread bar and creates a void in the dirt behind the trailing edge of the tread bar. This void does not have the density to support the weight of the work machine. Because the weight of the work machine is not supported by a portion of the track belt proximate to the void, the weight of the work machine is concentrated on the other portions of the rubber track belt in contact with dense soil. Concentrating the weight on a portion of the rubber track belt produces higher ground pressure and causes accelerated wear on the highly loaded portions of the rubber track belt.

Another problem with rubber track belts is wear caused when operating on roads or other hard surfaces. In particular, as the track belt advances around a drive wheel, the drive wheel applies a tension to the rubber track belt which stretches or elastically extends the rubber track belt. As the leading edge of the tread bars mounted on the rubber track belt disengage from the road, the tension in the rubber track belt pulls the trailing edge of the tread bar so as cause a scraping or scruffing action of the trailing edge of the tread bar along the surface of the road. This scruffing causes accelerated wear on the tread bar.

What is needed therefore is a rubber track belt which has improved traction and durability.

DISCLOSURE OF THE INVENTION

In accordance with a first embodiment of the present invention, there is provided a track belt assembly for a work machine which is operable to advance in a forward direction of movement. The track belt assembly includes an elastomeric track member which forms a closed loop. The elastomeric track member is advanced in a path of movement when the work machine is advanced in the forward direction of movement. The track belt assembly further includes a number of elastomeric tread bars mounted on an outer surface of the track member. A first cross section of each of the number of tread bars which is taken in a longitudinal direction which is oriented parallel to the forward direction of movement defines a leading terminal end point, a leading edge transition point, a trailing edge transition point, and a trailing terminal end point. The distance between said track member and each point of said first cross section which is interposed between said leading terminal end point and said leading edge transition point is smaller than the distance between said track member and said leading edge transition point. The distance between said track member and each point of said first cross section which is interposed between said trailing terminal end point and said trailing edge transition point is smaller than the distance between said track member and said trailing edge transition point. A leading longitudinal distance LD is defined between the leading terminal end point and the leading edge transition point. A trailing longitudinal distance TD is defined between the trailing terminal end point and the trailing edge transition point. The leading terminal end point is located ahead of the trailing terminal end point when the track member is advanced in the path of movement. The trailing longitudinal distance is greater than twice the leading longitudinal distance.

In accordance with a second embodiment of the present invention, there is provided a work machine which is operable in a forward direction of movement. The work machine includes a chassis, an engine mounted to the chassis, a drive wheel rotatably mounted to the chassis and mechanically coupled to the engine, an idler wheel rotatably mounted to the chassis, and a number of rollers mounted to the chassis which supports the weight of the work machine. The work machine further includes a track belt assembly which having an elastomeric track member which forms a closed loop around the drive wheel, the idler wheel, and the number of rollers. The elastomeric track member is advanced in a path of movement when the work machine is advanced in the forward direction of movement. The track belt assembly further has a number of elastomeric tread bars mounted on an outer surface of the track member. A first cross section of each of the number of tread bars which is taken in a longitudinal direction which is oriented parallel to the forward direction of movement defines a leading terminal end point, a leading edge transition point, a trailing edge transition point, and a trailing terminal end point. The distance between said track member and each point of said first cross section which is interposed between said leading terminal end point and said leading edge transition point is smaller than the distance between said track member and said leading edge transition point. The distance between said track member and each point of said first cross section which is interposed between said trailing terminal end point and said trailing edge transition point is smaller than the distance between said track member and said trailing edge transition point. A leading longitudinal distance LD is defined between the leading terminal end point and the leading edge transition point. A trailing longitudinal distance TD is defined between the trailing terminal end point and the trailing edge transition point. The leading terminal end point is located ahead of the trailing terminal end point when the track member is advanced in the path of movement. The trailing longitudinal distance is greater than twice the leading longitudinal distance.

In accordance with a third embodiment of the present invention, there is provided a track belt assembly for a work machine which is operable to advance in a forward direction of movement. The track belt assembly includes an elastomeric track member which forms a closed loop and which is advanced in a path of movement when the work machine is advanced in the forward direction of movement. The track belt assembly further includes a number of elastomeric tread bars mounted on an outer surface of the track member. A first cross section of each of the number of tread bars which is taken in a longitudinal direction which is oriented parallel to the forward direction of movement defines a leading terminal end point, a leading edge transition point, a trailing edge transition point, and a trailing terminal end point. The distance between said track member and each point of said first cross section which is interposed between said leading terminal end point and said leading edge transition point is smaller than the distance between said track member and said leading edge transition point. The distance between said track member and each point of said first cross section which is interposed between said trailing terminal end point and said trailing edge transition point is smaller than the distance between said track member and said trailing edge transition point. A leading longitudinal distance LD is defined between the leading terminal end point and the leading edge transition point. A trailing longitudinal distance TD is defined between the trailing terminal end point and the trailing edge transition point. The leading terminal end point is located ahead of the trailing terminal end point when the track member is advanced in the path of movement. The trailing longitudinal distance is greater than four times the leading longitudinal distance. The track member has a first lateral edge and a second lateral edge. Each of the number of tread bars having (i) a first outer edge which is positioned adjacent to the first lateral edge of the track member, and (ii) a second outer edge which is positioned adjacent to second lateral edge of the track member. The first outer edge is located ahead of the second outer edge when the track member is advanced in the path of movement.

BEST MODE FOR CARRYING OUT THE INVENTION

Figure 1:
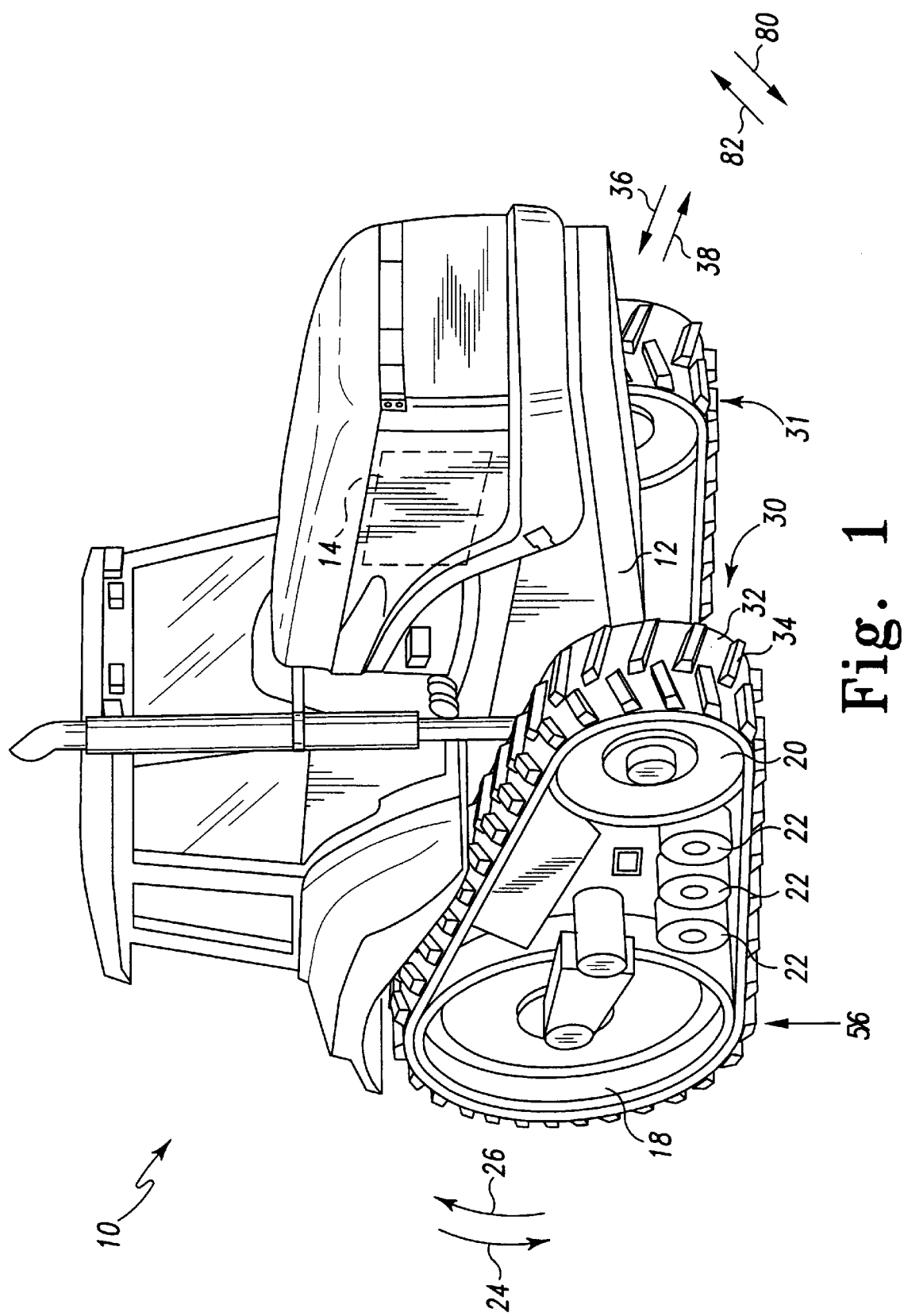
FIG. 1 is a perspective view of agricultural work machine having a rubber track belt which incorporates the features of the present invention therein (note that the tread bars on each of the track members are schematically depicted without the inventive details for clarity of description)

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown an agricultural work machine 10 which incorporates the features of the present invention therein. The work machine 10 includes a chassis 12, an engine assembly 14, and a track belt assembly 30. It should be noted that the work machine 10 further includes a second track belt assembly 31 substantially identical to the mechanical configuration of the track belt assembly 30. As a result, only the track belt assembly 30 is described in detail.

The chassis 12 is a frame that spans the length of the work machine 10 and provides a structure for mounting other components of the work machine 10 thereon. The work machine 10 further includes a drive wheel 18, an idler wheel 20, and three rollers 22. The drive wheel 18, the idler wheel 20, and the rollers 22 are each rotatably secured to the chassis 12 and are free to rotate in the general direction of arrows 24 and 26.

The track belt assembly 30 includes a track member 32 which forms a closed loop around the drive wheel 18, the idler wheel 20 and the three rollers 22. The track member 32 is composed primarily of an elastomeric material such as rubber. As the work machine 10 moves in a forward direction of movement indicated by the arrow 38, the track member 32 is advanced along a path of movement. The portion of the track member 32 that supports the rollers 22 moves in the general direction of arrow 36 as the track member 32 is advanced along the path of movement. The rear portion of the track member 32 in contact with the drive wheel 18, rotates about the drive wheel 18 in the general direction of arrow 26 as the track member is advanced along the path of movement. The upper portion of track member 32, above the rollers 22, moves in the general direction of arrow 38 as the track member 32 is advanced along the path. The front portion of the track member 32, in contact with the idler wheel 20, is advanced in the general direction of arrow 26 as the track member 32 is advanced along the path of movement. The track member 32 also has a number of tread bars 34 secured to an outer surface thereof. Note that the tread bars 34 on each of the track members 32 are schematically depicted without the inventive details for clarity of description.

The engine assembly 14 is mounted to the chassis 12. The engine assembly 14 includes an engine (not shown) and a transmission (not shown). The engine generates mechanical energy which is transferred to the transmission which outputs the mechanical energy to the drive wheel 18. The transmission allows an operator to selectively change the gear ratios between the engine and the drive wheel 18. The change of ratios allows the engine assembly 14 to provide a range of torque outputs to the drive wheel 18 for various operating conditions. In particular, high torque may be required at low speeds whereas low torque may be required at high speeds. As the drive wheel 18 is rotated in the general direction of arrow 26, the drive wheel 18 engages the track member 32 and advances the lower portion of the track member 32 in the general direction of arrow 36, which advances the work machine 10 in the general direction of arrow 38.

Figure 2:
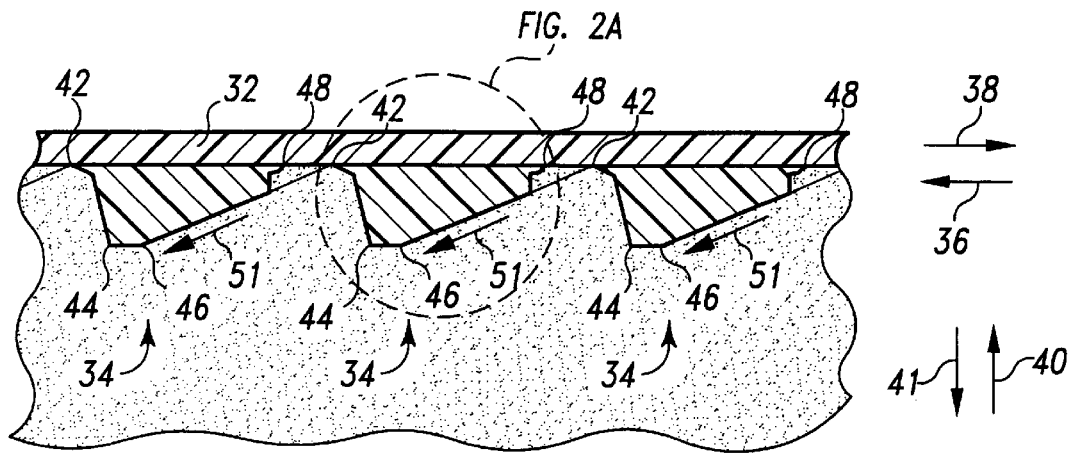
FIG. 2 is a fragmentary cross sectional view of a tread bar on the rubber track belt of the agricultural work machine of FIG. 1 (Note that only the cross sectioned portions of the tread bars 34 are shown in FIG. 2 for clarity of description)
Figure 2A:
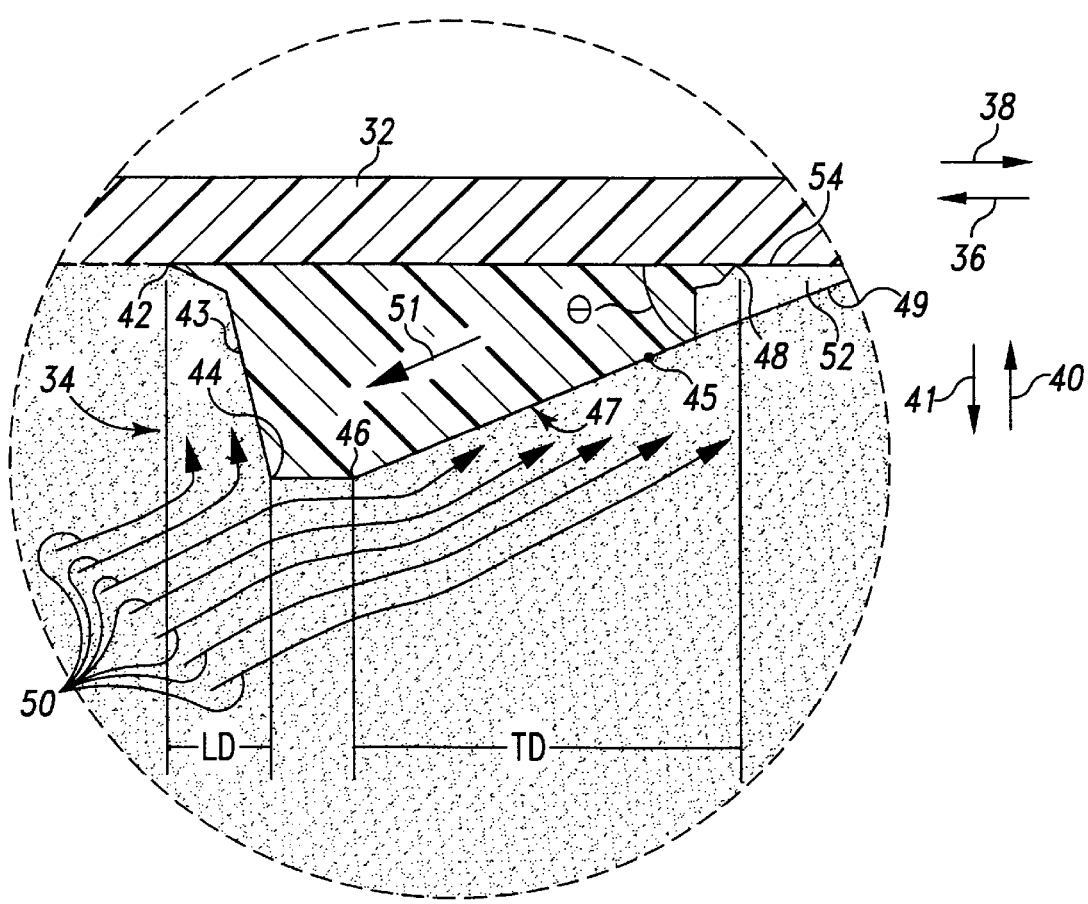
FIG. 2A is an enlarged cross sectional view of the tread bar of FIG. 2 showing the flow of dirt around the tread bar (Note that only the cross sectioned portions of the tread bar 34 is shown in FIG. 2A for clarity of description)

Referring now to FIGS. 2 and 2A, there is shown a first cross section of the track member 32 and tread bar 34 taken longitudinally, i.e. along the length of the track belt assembly (Note that only the cross sectioned portions of the tread bars 34 are shown in FIGS. 2 and 2A for clarity of description). This portion of the track member 32 is under the rollers 22 and in contact with the ground beneath the work machine 10. A leading terminal point 42 is the most forward point where the tread bar 34 meets the track member 32. The forward direction being the direction indicated by arrow 36, which is the direction of movement of the lower portion of the track member 32 when the work machine 10 is advancing in the general direction of arrow 38. A leading edge transition point 44 is defined as the point at which all points of the tread bar forward (in the general direction of arrow 36) of the leading edge transition point 44 are closer to the track member 32 in the general direction of arrow 40 than any point between the forward transition point 44 and the forward terminal point 42. The area between the leading edge transition point 44 and the forward terminal end 42 is the leading edge 43 of the tread bar 34. The longitudinal distance, i.e. in the general direction of arrow 36, between the leading edge transition point 44 and the leading terminal point 42 defines a leading longitudinal distance as shown in FIG. 2A.

Similarly, a trailing terminal end point 48 is the most rearward point where the tread bar 34 meets the track member 32. The rearward direction being the direction indicated by arrow 38, which is opposite to the direction of movement of the lower portion of the track member 32 when the work machine 10 is advancing in the forward direction indicated by arrow 38. A trailing edge transition point 46 is defined as the point at which all points of the tread bar rearward (in the general direction of arrow 38) of the trailing edge transition point 46 are closer to the track member 32 in the general direction of arrow 41 than any point between the trailing edge transition point 46 and the trailing terminal end point 48. The area between the trailing edge transition point 44 and the trailing terminal end point 48 is the trailing edge 47 of the tread bar 34. The longitudinal distance, i.e. in the general direction of arrow 38, between the trailing edge transition point 46 and the trailing terminal point 48 defines a trailing longitudinal distance TD as shown in FIG. 2A. It should be noted that TD is preferably about four times greater than LD. This configuration provides the tread bar 34 with significant advantages over tread bars heretofore designed. Additionally, some of these advantages are provided to any tread bar having a TD more than two times greater than the LD. A trailing edge midpoint 45 lies one half of the vertical distance between said trailing edge transition point 46 and said track member 32 and is positioned on the outer surface of the tread bar 34 between said trailing edge transition point 46 and the trailing terminal end point 48. The trailing edge transition point 46 and the trailing edge midpoint 45 define a line 49 which intersects the outer surface of the track member 32 to form an angle $\Theta$. In the preferred embodiment, $\Theta$ is approximately twenty five degrees, however, some of the advantages of the present invention are provided to any tread bar where $\Theta$ is between ten and forty degrees.

Figure 3:
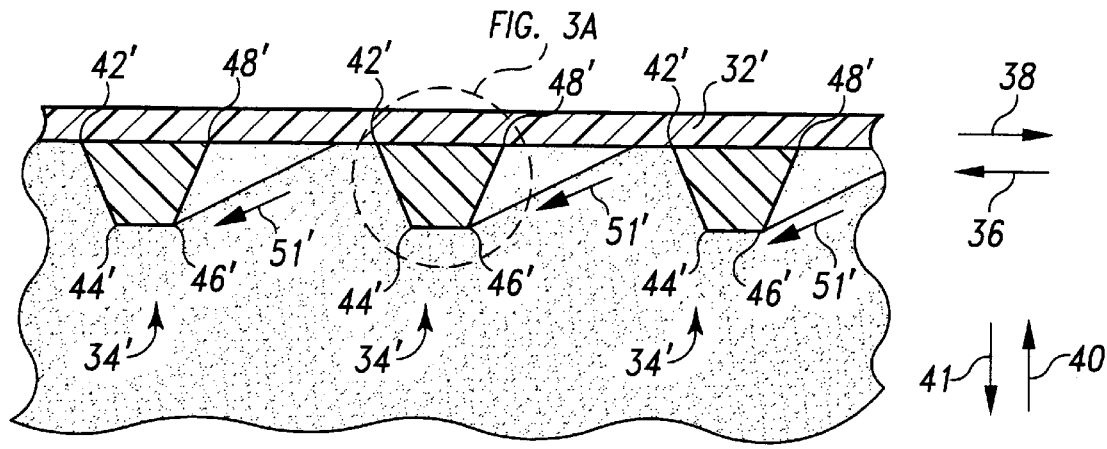
FIG. 3 is a fragmentary cross sectional view of a prior art tread bar on the rubber track belt (Note that only the cross sectioned portions of the tread bars 34' are shown in FIG. 3 for clarity of description)
Figure 3A:
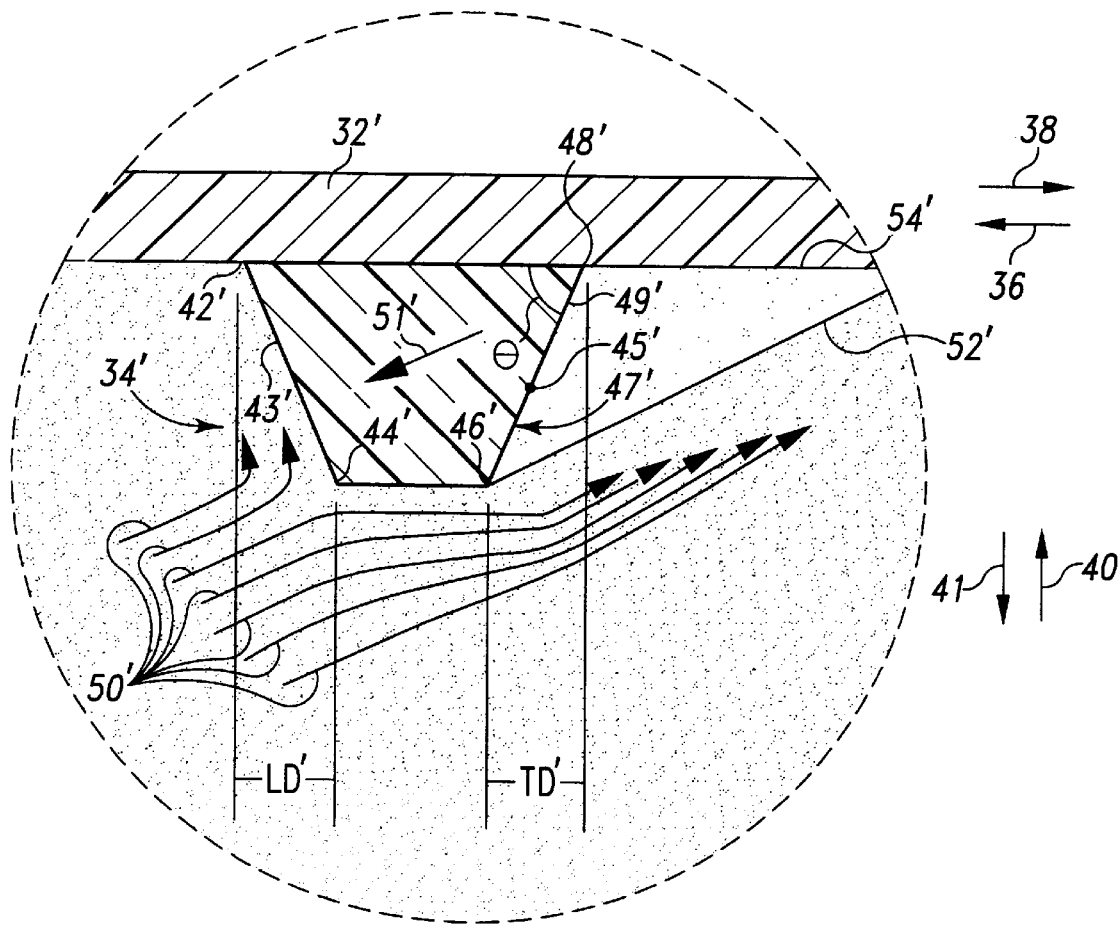
FIG. 3A is a cross sectional view of the tread bar of FIG. 3 showing the flow of dirt around the tread bar (Note that only the cross sectioned portion of the tread bar 34' is shown in FIG. 3A for clarity of description)

Referring now to FIGS. 3 and 3A, there is shown a first cross section of a prior tread bar 34' mounted on a track member 32' similar to the track member 32 (Note that only the cross sectioned portions of the tread bars 34' are shown in FIGS. 3 and 3A for clarity of description). This portion of the track member 32' is under the rollers 22 and in contact with the ground beneath the work machine 10. A leading terminal point 42' is the most forward point where the tread bar 34' meets the track member 32'. A leading edge transition point 44' is defined as the point at which all points of the tread bar forward (in the general direction of arrow 36) of the leading edge transition point 44' are closer to the track member 32' in the general direction of arrow 40 than any point between the forward transition point 44 and the leading terminal point 42'. The area between the leading edge transition point 44' and the forward terminal end 42' is the leading edge 43' of the tread block 34'. The longitudinal distance, i.e. in the general direction of arrow 36, between the leading edge transition point 44' and the leading terminal point 42' defines a leading longitudinal distance LD' as shown in FIG. 3A. A trailing edge midpoint 45' lies one half of the vertical distance between said trailing edge transition point 46' and said track member 32' and is positioned on the outer surface of the tread bar 34' between said trailing edge transition point 46' and the trailing terminal end point 48'. The trailing edge transition point 46' and the trailing edge midpoint 45' define a line 49' which intersects the outer surface of the track member 32' to form an angle $\Theta'$. In the prior art tread bar 34', $\Theta'$ is approximately sixty five degrees.

Similarly, a trailing terminal end point 48' is the most rearward point where the tread bar 34' meets the track member 32'. A trailing edge transition point 46' is defined as the point at which all points of the tread bar rearward of the trailing edge transition point 46' are closer to the track member 32' in the general direction of arrow 40 than any point between the trailing edge transition point 46' and the trailing terminal end point 48'. The area between the trailing edge transition point 44' and the trailing terminal end point 48' is the trailing edge 47' of the tread block 34'. The longitudinal distance, i.e. in the general direction of arrow 38, between the trailing edge transition point 46' and the trailing terminal point 48' defines a trailing longitudinal distance TD' as shown in FIG. 3A. It should be noted that the ratio of TD' to LD' is approximately equal one, which is significantly less than the ratio of TD to LD which is approximately equal to four in the preferred embodiment of the present invention.

Referring now only to FIG. 3A, there is an enlarged view of the prior art tread bar 34' which illustrates the drawbacks of the prior art tread bar 34'. As the track member 32' propels a work machine similar to the work machine 10, the weight of the work machine 10 forces the tread bars 34' downward in the general direction of arrow 41 while the movement of the track member 32' in the general direction of arrow 36 moves the tread bar 34' in the general direction of arrow 36. The combined downward and rearward motion is illustrated by arrow 51'. The streamlines 50' show the flow of soil or other soft material created when the tread bar 34' is advanced therethrough. The soil is compressed on the leading edge 43' whereas a void 52' is created proximate to the trailing edge 47'. The void 52' is a region of lightly compressed soil. A disadvantage to the formation of the void 52' is that the void 52' does not support a portion 54' of the track member 32' directly above the void 52'. Thus, a greater portion of the weight of the work machine 10 must be supported by the other portions of the track member 32', such as the portion under the tread bar 34'. This concentration of the weight of the work machine 10 causes the work machine to sink deeper into the ground as the work machine is advanced in the general direction of arrow 38.

In addition, the flow of the soil around the prior art tread block 34' causes accelerated wear around the trailing edge transition point 46'. In particular, as the tread bar 34' moves through the soil, the flow of soil illustrated by the flow lines 50' makes an abrupt transition in the general direction of arrow 40 near the trailing edge transition point 46'. As the flow makes this transition, the flow lines become closer together, thus indicating a pressure concentration acting on the tread bar 34' near the trailing edge transition point 46'. This pressure concentration, in conjunction with the increased weight supported by the tread bars due to the formation of the large voids 52' accelerates the wear around the trailing edge transition point 46'.

Referring now to FIG. 2A, there is shown an enlarged view of one of the tread bars 34 of the track belt assembly 30 of the present invention. This tread bar design overcomes many of the drawbacks of the prior art tread bar 34'. As the track member 32 propels a work machine 10, the weight of the work machine 10 forces the tread bar 34 downward in the general direction of arrow 41 while the movement of the track member 32 in the general direction of arrow 36 moves the tread bars 34 in the general direction of arrow 36. The combined downward and rearward motion is illustrated by arrow 51. The streamlines 50 show the flow of soil or other soft material created when the tread bar 34 is advanced therethrough. The soil is compressed on the leading edge 43 whereas a void 52 is created proximate to the trailing edge 47. It should be appreciated that the void 52 created by the tread bar 34 is much smaller that the void 52' created by prior art tread bar 52' shown in FIG. 3A.

Figure 4:
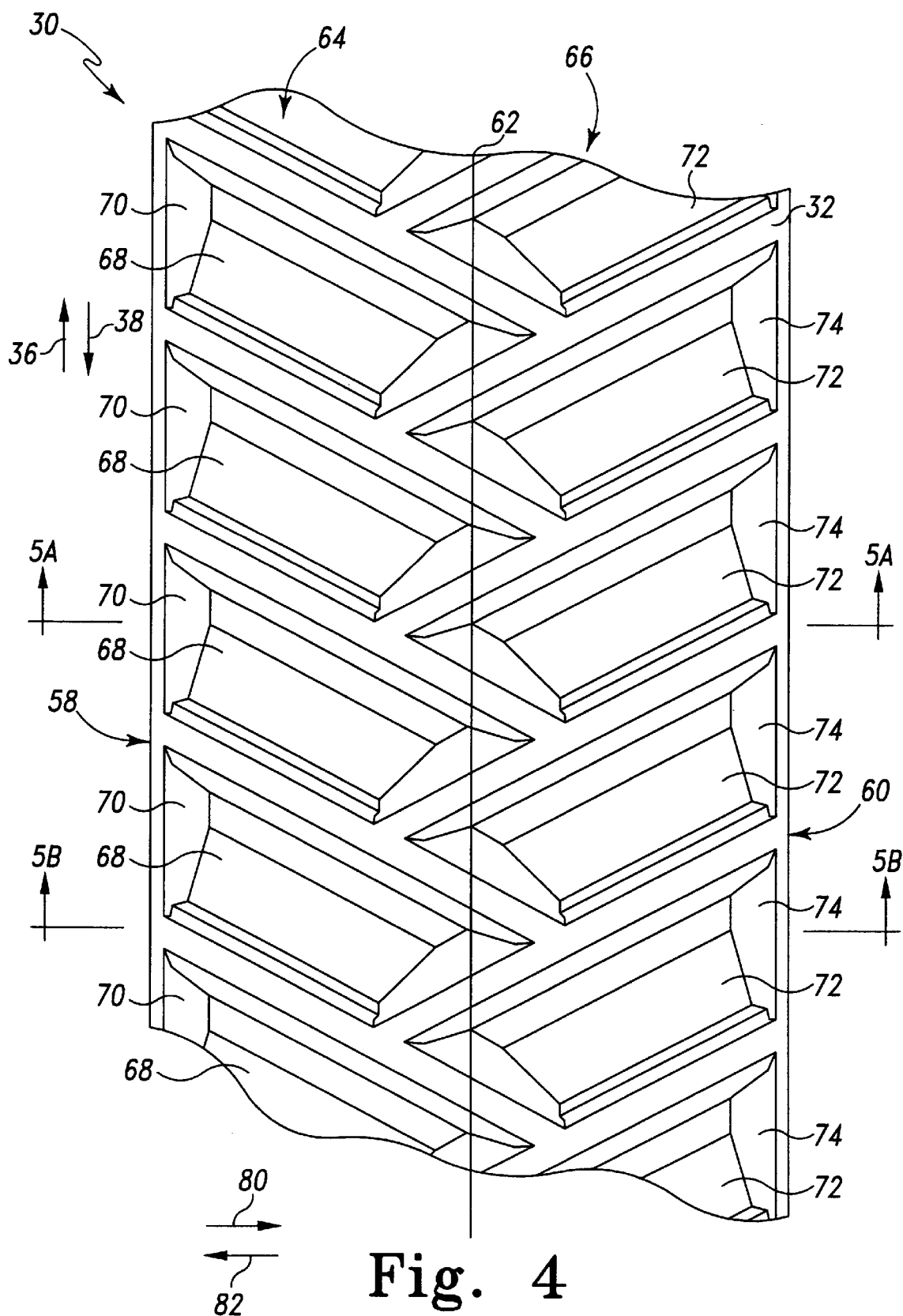
FIG. 4 is a fragmentary outer elevational view of the outer surface of the tread bars on the rubber track belt of FIG. 1.

Referring now to FIG. 4, there shown the track belt assembly 30 having a first arrangement of tread bars on the track member 32. This is a view of the track belt assembly 30 as shown in FIG. 1 as viewed in the general direction of arrow 56. The track member 32 has a left lateral edge 58 and a right lateral edge 60. A midline 62 of the track member 32 is equidistant from the left lateral edge 58 and the right lateral edge 60. A left region 64 is defined between the midline 62 and the left lateral edge 58. A right region 66 is defined between the midline 62 and the right lateral edge 60.

A number of left tread bars 68 are secured to the track member 32. Each of the left tread bars 68 has a left outer edge 70 defined thereon. Each of the left outer edges 70 is positioned adjacent to the left lateral edge 58 of the track member 32. Similarly, A number of right tread bars 72 are secured to the track member 32. Each of the right tread bars 72 has a right outer edge 74 defined thereon. Each of the right outer edges 74 is positioned adjacent to the right lateral edge 60 of the track member 32. It should be appreciated that a portion of each of the left tread bars 68 is positioned in right region 66, whereas the majority of each left tread bar 68 is positioned in the left region 64. It should further be appreciated that a portion of each of the right tread bars 72 is positioned in left region 64, whereas the majority of each right tread bar 72 is positioned in the right region 66. It should be noted that the angle from the midline 62 to the leading edge of each left tread bar 68 is approximately sixty degrees whereas the angle from the midline 62 to the leading edge of each right tread bar 72 is approximately negative sixty degrees.

Figure 5A:
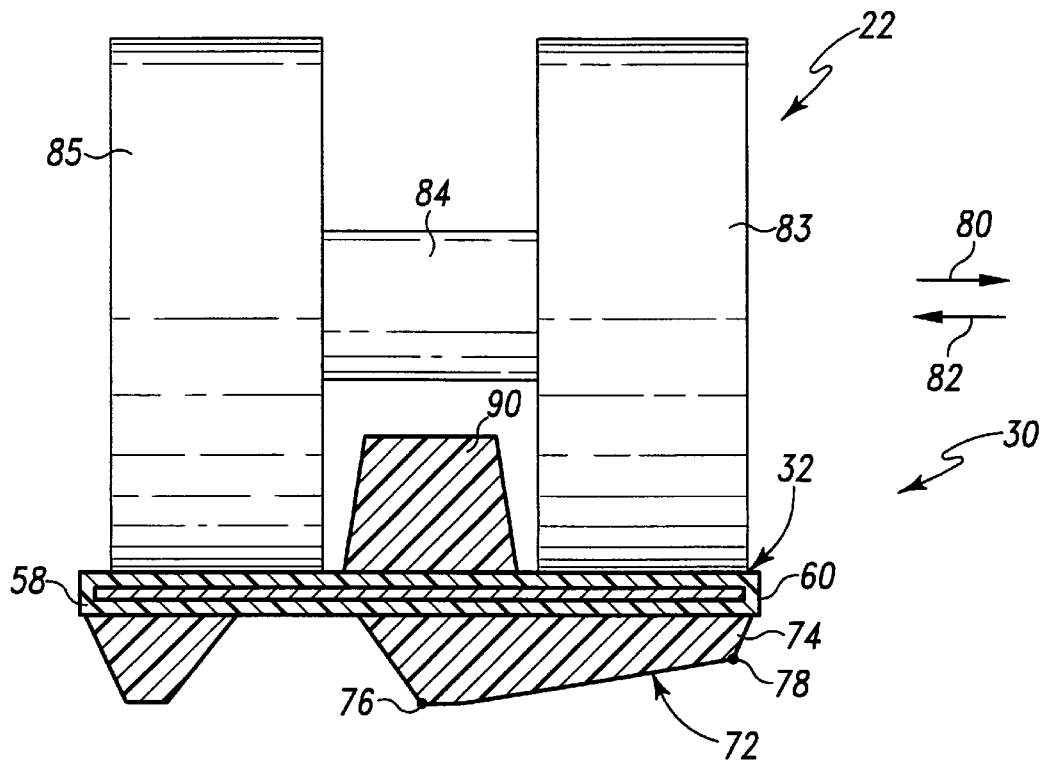
FIG. 5A is a cross sectional view of the rubber track belt taken along line 5A—5A of FIG. 4, as viewed in the direction of the arrows, note that the rollers of the agricultural work machine are also shown for clarity of description.

Referring now to FIG. 5A, there is shown a second cross section of the track belt assembly 30. The second cross section is taken is taken in a transverse direction across the right tread bar 72 and perpendicular to the midline 62 shown in FIG. 4. The second cross section defines a right inner transition point 76. The right inner transition point 76 is highest point on the right tread bar 72 which is furthest from the right lateral edge 60. A right outer transition point 78 is the point of the right tread bar 72 where the right outer edge 74 intersects with the lowermost outer surface of the right tread bar 72. It should be appreciated that all points of the second cross section which are interposed between the right inner transition point 76 and the right outer transition point 78 are equidistant or closer to the track member 32 than the right inner transition point 76. This gives the second cross section a ramp like structure that allows the right tread bar 72 to easily slide or ski across the ground as the right tread bar 72 is urged in the general direction of arrow 80 such as during a right turn of the work machine 10.

Figure 5B:
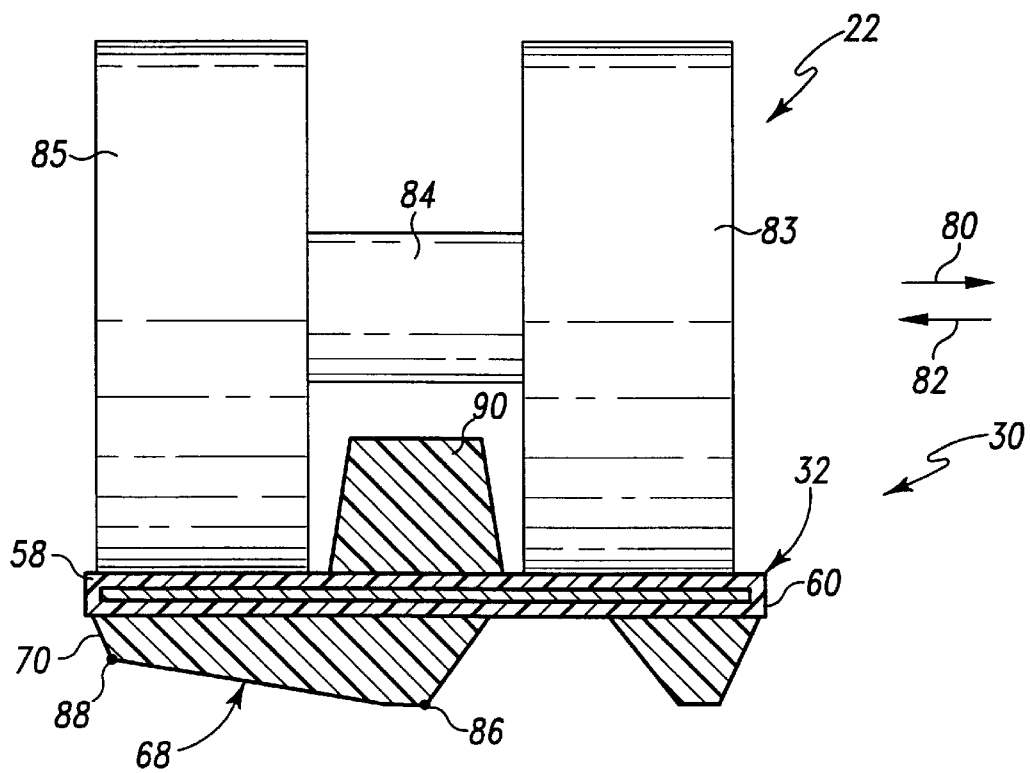
FIG. 5B is a cross sectional view similar to FIG. 5A, but taken along the line 5B—5B of FIG. 4, as viewed in the direction of the arrows, note that the rollers of the agricultural work machine are also shown for clarity of description.

Referring now to FIG. 5B, there is shown a third cross section of the track belt assembly 10. The third cross section is taken is taken in a transverse direction across the left tread bar 68 and perpendicular to the midline 62 shown in FIG. 4. The third cross section defines a left inner transition point 86. The left inner transition point 86 is highest point on the left tread bar 68 which is furthest from the left lateral edge 58. A left outer transition point 88 is the point of the left tread bar 68 where the left outer edge 70 intersects with the lowermost outer surface of the left tread bar 68. It should be appreciated that all points of the third cross section which are interposed between the left inner transition point 86 and the left outer transition point 88 are equidistant or closer to the track member 32 than the left inner transition point 86. This gives the third cross section a ramp like structure that allows the left tread bar 68 to easily slide or ski across the ground as the left tread bar 68 is urged in the general direction of arrow 82 such as during a left turn of the work machine 10.

Referring now to FIGS. 5A and 5B, there is shown the configuration of the roller 22. Each roller 22 is composed of an outer wheel 83, an inner wheel 85, and an axle 84. The inner wheel 85 and the outer wheel 85 are supported by the track member 32. A guide block 90 is secured to an inner surface of the track member 32 and maintains the track member 32 in proper alignment as the track member 32 is advanced past the guide block 90 in the path of movement. This configuration places a majority of the weight of the work machine 10 on the outer portions of the track member 32 near the left lateral edge 58 and right lateral edge 60, while placing less weight on the inner portion of the track member 32 under the guide block 90.

Figure 6A:
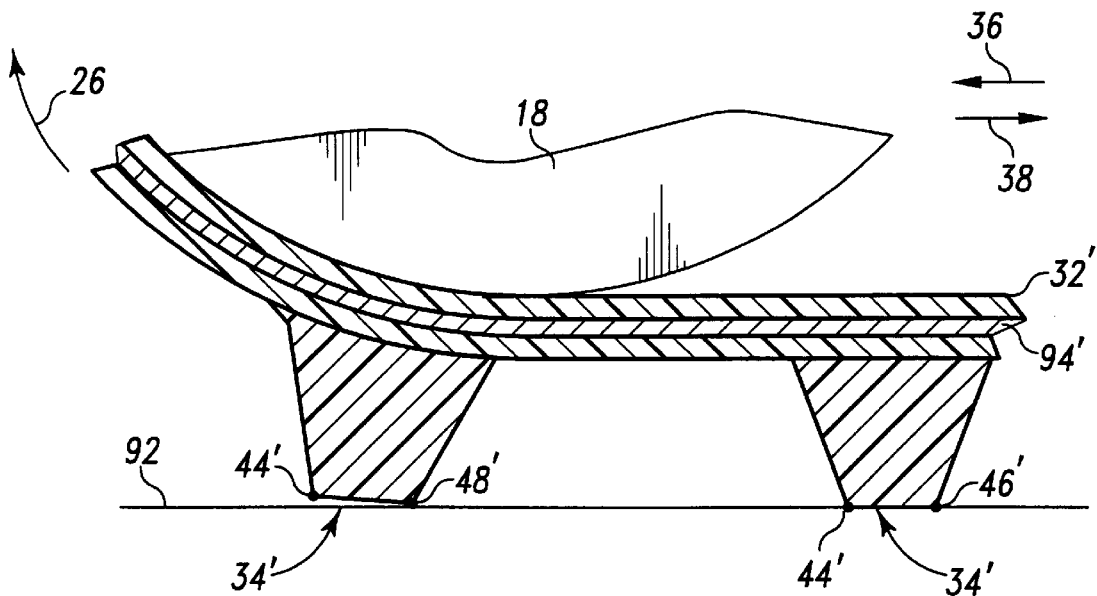
FIG. 6A is a fragmentary side elevational view of a prior art tread bar oriented perpendicular to the rubber track belt.
Figure 6B:
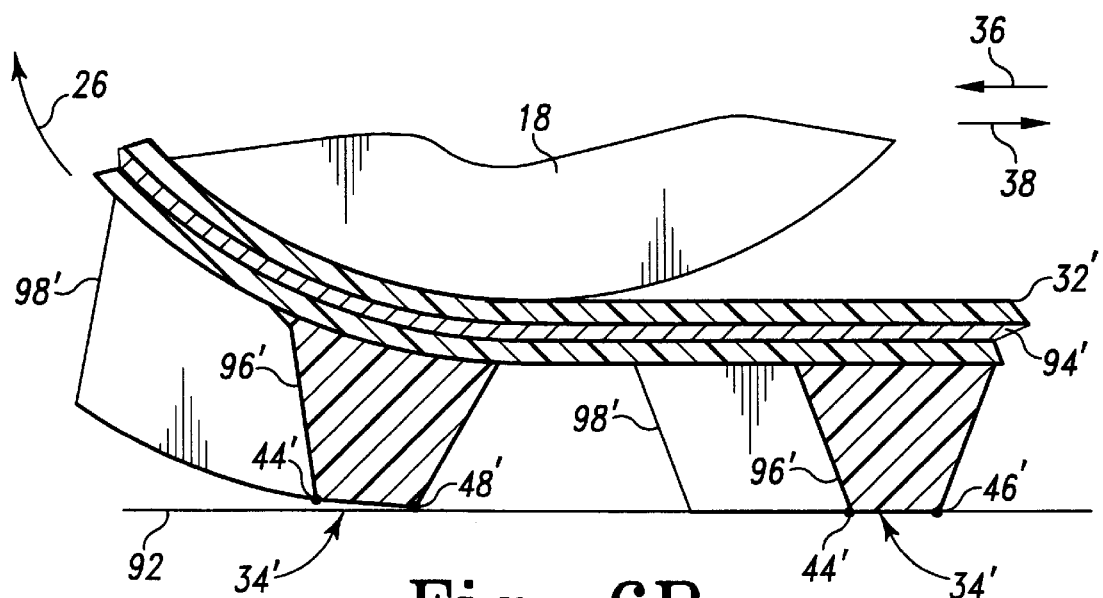
FIG. 6B is a fragmentary side elevational view a prior art tread bar mounted in an inverted "V" arrangement.

Referring now to FIGS. 6A and 6B, there is shown a prior art tread bar 34' operating on a hard surface such as a road 92. The track member 32' further includes a steel belt 94' that gives the track member 32' additional strength. To move the work machine 10 in the forward direction of movement indicated by arrow 38, the track member 32' is advanced in the general direction of arrow 36 by the drive wheel 18. As the track member 32' is advanced around the drive wheel 18 in the general direction of arrow 26, the rigid steel belt 94' conforms to the shape of the drive wheel 18. All of the elastomeric material of the track member 32', including the tread bars 34', positioned farther away from the drive wheel 18 than that steel belt 94' elastically deforms as the track member 32' is advanced around the drive wheel 18.

FIG. 6A shows a prior art tread bar 34' oriented transversely with respect to the track member 32'. As the track member 32' is advanced around the drive wheel 18, the tread bar 34' is pulled in the direction of arrow 26. As the tread bar 34' advances with the track member 32', the leading edge transition point 44' separates from the road 92 and advances in the general direction of arrow 26. The trailing edge transition point 46' remains in contact with the road 92.

FIG. 6B shows a typical prior art tread bar 34' oriented with respect to the track member 32' such that the outer portion 96' of the tread bar 34' trails the inner portion 98' of the tread bar 34' as the track member 32' is advanced in the general direction of arrow 26 when the work machine 10 is advanced in the forward direction.

Figure 7A:
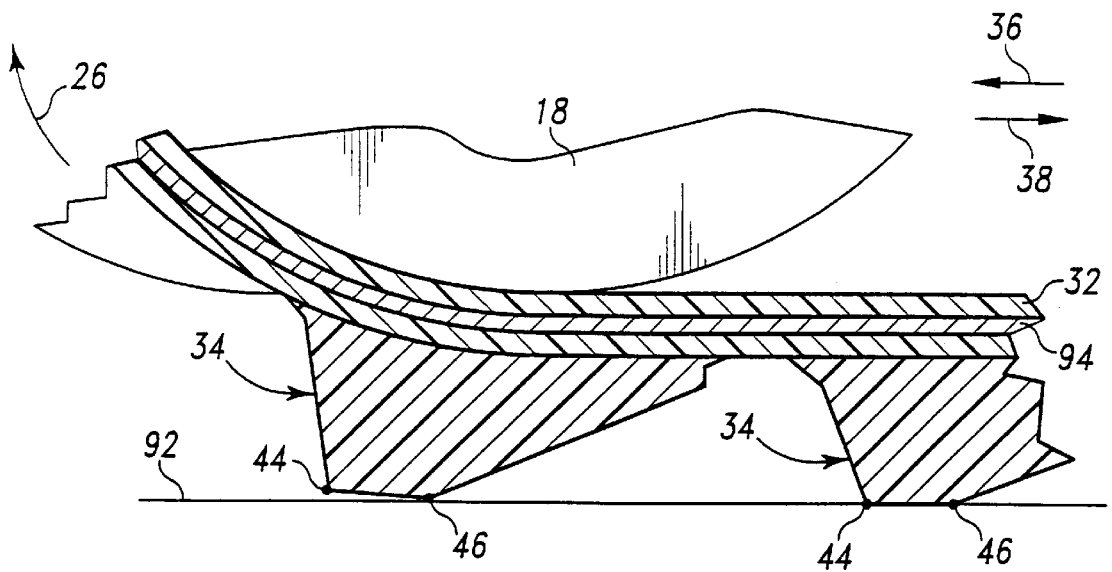
FIG. 7A is a fragmentary cross sectional view of the tread bar of FIG. 1 oriented perpendicular to the rubber track belt.
Figure 7B:
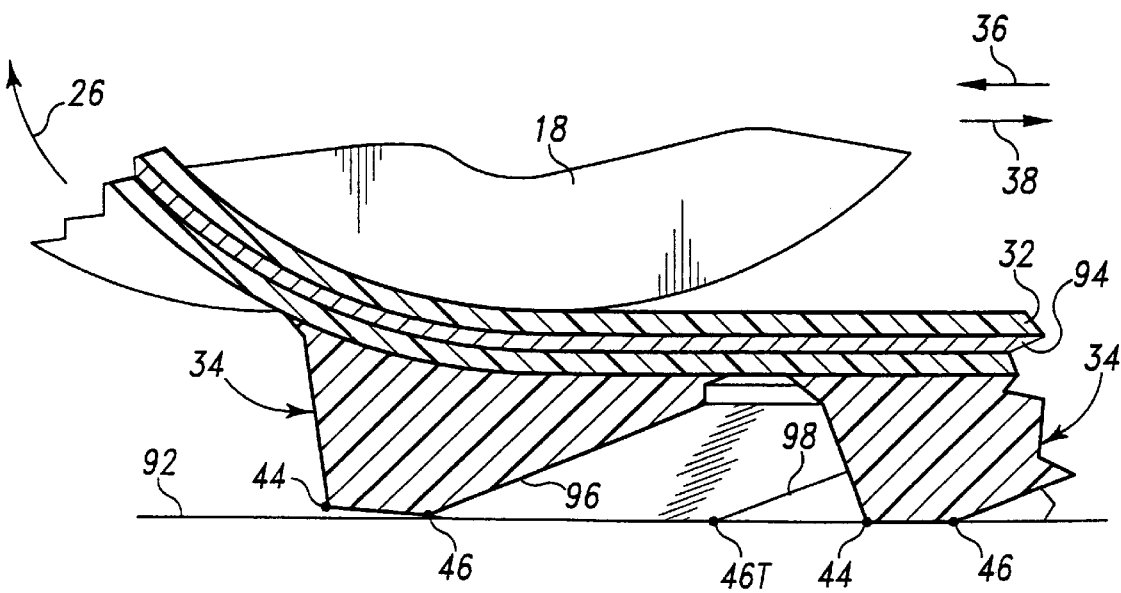
FIG. 7B is a fragmentary cross sectional view of the tread bar of FIG. 7A arranged in the pattern shown in FIG. 4.

Referring now to FIGS. 7A and 7B, there is shown the tread bar 34 operating on a hard surface such as the road 92. The track member 32 further includes a steel belt 94 that gives the track member 32 additional strength. To move the work machine 10 in the forward direction of movement indicated by arrow 38, the track member 32 is advanced in the general direction of arrow 36 by the drive wheel 18. As the track member 32 is advanced around the drive wheel 18 in the general direction of arrow 26, the rigid steel belt 94 conforms to the shape of the drive wheel 18. All of the elastomeric material of the track member 32, including the tread bars 34, positioned farther away from the drive wheel 18 than that steel belt 94 elastically deforms as the track member 32 is advanced around the drive wheel 18.

FIG. 7A shows the tread bar 34 of the present invention oriented transversely with respect to the track member 32. As the track member 32 is advanced around the drive wheel 18, the tread bar 34 is pulled in the direction of arrow 26. As the tread bar 34 advances, the leading edge transition point 44 separates from the road 92 and advances in the general direction of arrow 26. The trailing edge transition point 46 remains in contact with the road 92.

FIG. 7B shows the tread bar 34 oriented with respect to the track member 32 such that the outer portion 96 of the tread bar 34 leads the inner portion 98 of the tread bar 34 as the track member 32 is advanced in the general direction of arrow 26 when the work machine 10 is advanced in the forward direction.

Figure 8:
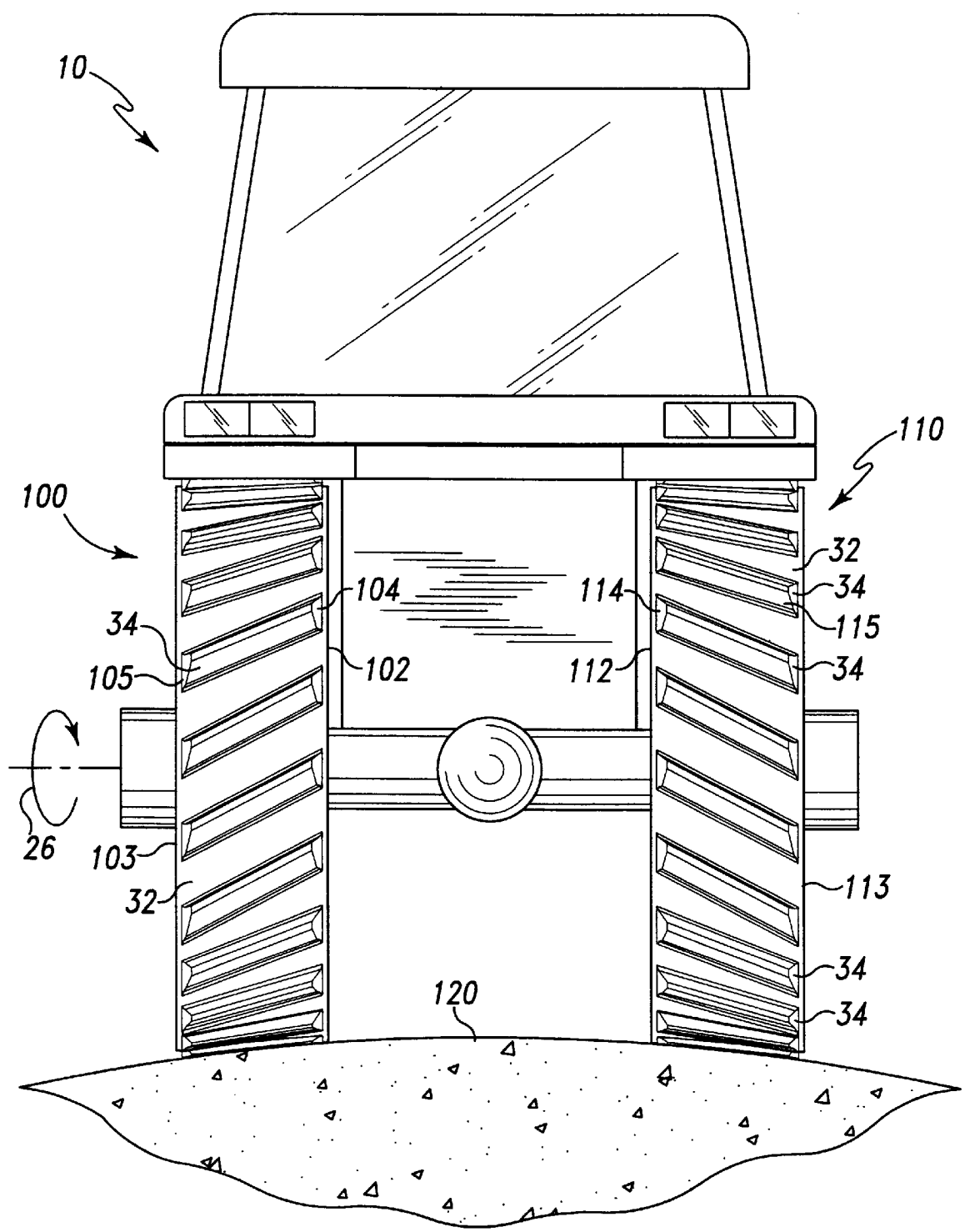
FIG. 8 is a rear elevational view of the work machine of FIG. 1, mounting a pair of alternate track belts with the tread bars shown in FIG. 2, note that the alternate track belts are non symmetric and includes a right track belt having a first diagonal orientation, and a left track belt having a second diagonal orientation.

Referring now to FIG. 8, there is shown a rear view of the work machine 10 operating on a crowned surface 120 and showing a second embodiment of the track belt assembly of the present invention. The tread bars 34 are positioned on the track member 32 of a left track belt assembly 100 and on the track member 32 of a right track belt assembly 110. Because of the non-symmetric arrangement of the track bars 34, the left track belt assembly 100 differs from the right track belt assembly 110.

The left track belt assembly 100, has a first lateral edge or left inner lateral edge 102 and second lateral edge or a left outer lateral edge 103. The tread bars mounted on the left track belt assembly 100 have a first outer edge or left inner edge 104 adjacent to the left inner lateral edge 102 of the left track belt assembly 100. Similarly, the tread bars 34 mounted on the left track belt assembly 100 have a second outer edge or left outer edge 105 adjacent to the left outer lateral edge 103 of the left track belt assembly 100. The left inner edge 104 is located ahead of the left outer edge 105 when the left track belt assembly 100 is advanced in the general direction of arrow 26 as the work machine 10 is advanced in the forward direction.

The right track belt assembly 110, has a first lateral edge or right inner lateral edge 112 and second lateral edge or a right outer lateral edge 113. The tread bars mounted on the right track belt assembly 110 have a first outer edge or right inner edge 114 adjacent to the right inner lateral edge 112 of the right track belt assembly 110. Similarly, the tread bars 34 mounted on the right track belt assembly 110 have a second outer edge or right outer edge 115 adjacent to the right outer lateral edge 113 of the right track belt assembly 110. The right inner edge 114 is located ahead of the right outer edge 115 when the right track belt assembly 110 is advanced in the general direction of arrow 26 as the work machine 10 is advanced in the forward direction.

INDUSTRIAL APPLICABILITY

In operation, as the work machine 10 is advanced forward in the general direction of arrow 38, the portion of the track member 32 in contact with the ground is advanced in the general direction of arrow 36 as shown in FIG. 1.

Referring to FIGS. 2, 2A, 3, and 3A, when operating the work machine 10 on a soft surface, it should be appreciated that the void 52 created by tread bar 34 of present invention shown in FIG. 2A is much smaller than the void 52' created by the prior art tread bar 34' shown in FIG. 3A. The portion 54 of the track member 32 supported by the void 52 is much smaller than the portion 54' supported by the void 52' shown in FIG. 3A. Thus, when using the tread bar 34 of the present invention, the weight of the work machine 10 is supported by a greater portion of the track member 32 whereas when using the prior art tread bar 34' the weight of the work machine 10 is supported by a lesser portion of the track member 32'. Supporting the weight of the work machine 10 over a greater portion of the track member 32 by reducing the size of the voids 52 allows the work machine 10 to operate on softer ground relative to similar work machines which employ the prior art tread bar 34'. Also, creation of the smaller void 52 allows the ground to apply a greater force to subsequent tread bars 34 thereby allowing the subsequent tread bars 34 to move through the soft surface with less slippage.

In addition, the flow of the soil around the tread bar 34 of the present invention shown in FIG. 2A causes less wear around the trailing edge transition point 46 when compared to the prior art tread block 34' shown in FIG. 3A. In particular, as the tread bar 34 moves through the soil, the flow of soil illustrated by the flow lines 50 makes a smooth transition in the general direction of arrow 40 around the trailing edge transition point 46. As the flow makes this transition, the flow lines are spaced farther apart as compared to the flow lines around the prior art tread bar 34', thus indicating a lesser pressure concentration acting on the tread bar 34 near the trailing edge transition point 46 as compared to the prior art tread bar 34'. This lesser pressure concentration, in conjunction with the reduced weight supported by the tread bars due to the formation of the smaller voids 54 significantly reduces the wear around the trailing edge transition point 46 as the work machine is advanced on a soft surface.

When it is necessary to turn the work machine 10, the track member 32 must move along the ground in the general direction of arrows 80 and 82 shown in FIG. 1. Referring now to FIGS. 5A, it should be appreciated that all points of the right tread bar 72 which are interposed between the right inner transition point 76 and the right outer transition point 78 are equidistant or closer to the track member 32 than the right inner transition point 76. This gives the right tread bar 72 a ramp like structure that allows the right tread bar 72 to easily slide or ski across the ground as the track member 32 is urged in the general direction of arrow 80, thus making it easier to move the track member 32 in the general direction of arrow 80.

Similarly, referring to FIG. 5B, it should be appreciated that all points of the left tread bar 68 which are interposed between the right inner transition point 86 and the right outer transition point 88 are equidistant or closer to the track member 32 than the right inner transition point 86. This gives the left tread bar 68 a ramp like structure that allows the left tread bar 68 to easily slide or ski across the ground as the left tread bar is urged in the general direction of arrow 82, thus making it easier to move the track member 32 in the general direction of arrow 82.

Referring now to FIGS. 6A, 6B, 7A, and 7B, there is shown the advantages of the present invention when operating the work machine 10 on hard surfaces such as the road 92. When comparing the transversely oriented tread bar 34 of the present invention shown in FIG. 7A to the transversely oriented prior art tread bar 34' shown in FIG. 6A, the reduced amount of scruffing at the point 46 is illustrated. At some point, the leading edge transition point 44, 44' is advancing around the drive wheel 18 while the respective trailing edge transition point 46, 46' of the same tread bar 34, 34' remains in contact with the ground. This relative movement of two parts of the same tread bar 34, 34' creates an elastic distortion in the elastomeric material in the respective tread bar 34, 34'.

The distortion applies an elastic force on the respective trailing edge transition point 46, 46' in the general direction of arrow 26. However, the elastic force in the present invention is applied to the much larger amount of elastomeric material following the leading edge transition point 44 as compared to a smaller amount of material following the leading edge transition point 44' of the prior art tread bar 34'. Because of the greater amount of elastomeric material in the tread bar 34, the center of mass of the tread bar 34 is moved to a point behind the trailing edge transition point 46 thus moving the point at which the tread bar 34 scruffs against the road 92 to a point later in the path of movement of track member 32. Whereas, because of the lesser amount of elastomeric material in the prior art tread bar 34', the center of mass of the tread bar 34' is forward of the trailing edge transition point 46' and the tread bar 34' scruffs against the road 92 earlier in the path of movement of track member 32. Therefore, the trailing edge transition point 46 of the present invention is scruffed across a reduced distance of the hard surface of the road 92 when compared to the trailing edge transition point 46' of the prior art tread bar 34'. This reduced distance of scruffing causes less wear at the trailing edge transition point 46 of the tread bar 34, in comparison to that caused at the trailing edge transition point 46' of the prior art tread bar 34'.

The arrangement of the tread bars 34 also has advantages over prior art arrangements when operating on hard surfaces such as the road 92. In a manner similar the transversely mounted tread bars 34, 34' shown in FIGS. 6A and 7A, advancing the track member 32 around the drive wheel 18 causes scruffing at the respective trailing edge transition points 46, 46'.

Referring to the prior art arrangement shown in FIG. 6B, the outer portion 96' trails the inner portion 98' as the work machine 10 is advanced in the forward direction. Because the outer portion 96' trails the inner portion 98', scruffing is more likely to occur on the trailing edge transition point 46' of the outer portion 96' than a trailing edge transition point (not shown) of the inner portion 98. As shown in FIGS. 5A and 5B, and discussed above, the weight of the work machine 10 is concentrated near the outer portion of the tread member 32. Thus, the scruffing occurs where the weight of the work machine is concentrated, resulting in increased wear on the tread bar 34'.

Referring to the arrangement of the tread bars 34 of the present invention shown in FIG. 7B, the outer portion 96 leads the inner portion 98. Because the outer portion 96 leads the inner portion 98, scruffing is more likely to occur on a trailing edge transition point 46T of the inner portion 98 than the trailing edge transition point 46 of the outer portion 96. As shown in FIGS. 5A and 5B, and discussed above, the weight of the work machine 10 is concentrated near the outer portion of the tread member 32, and a lesser amount of weight is supported by the inner portion of the track member 32 under the guide block 90 shown in FIGS. 5A and 5B. Thus, the scruffing occurs where the weight of the work machine 10 is less concentrated, resulting in a reduced amount of wear on the tread bars 34. In addition, because the scruffing increases wear on the inner portions of the tread bar 34 and the weight of the work machine 10 increases wear on the outer portions of the tread bar 34, the tread bar 34 tends to wear more evenly along its length.

Thus, the configuration shown in FIG. 7B moves the scruffing to the inner portion 98 of the tread bar 34, which supports less weight than the outer portion 96. By decreasing the distance that the tread bar 34 is scruffed along the road 92, by using the tread bar 34, and moving the scruffing action to a portion of the tread bar 34 that supports less weight, by using the arrangement shown in FIG. 4, the tread bar 34 has vastly reduced wear than the prior art tread bar 34' shown in FIG. 6B.

Referring to FIG. 8, the second embodiment of the present invention uses the tread bars 34 of the first embodiment and has significant advantages when operating the work machine on the crowned surface 120. Because of the crowned surface, the road is higher toward the center of the work machine 10, and lower toward the left edge of the work machine 10. Therefore, the left track belt assembly 100 is highly compressed near the left inner lateral edge 102 and less compressed near the left outer lateral edge 103. As the tread bars 34 are advanced in the general direction of arrow 26, the portion of the tread bar closest to the left inner lateral edge 102 separates from the crowned surface 120 first. As the left track belt assembly 100 is advanced in the general direction of arrow 26, elastic forces will pull on the tread bar 34 so as to scruff the portion of the tread bar 34 closest to the left outer lateral edge along the crowned surface 120. Since the left outer lateral edge 103 is less compressed, due to the crowned road 120, then the amount of wear is reduced due to the reduced force on this portion of the left track assembly 100.

When the right track belt assembly 110 is operated on a crowned surface 120, the road is higher toward the center of the work machine 10, and lower toward the right edge of the work machine 10.

Therefore, the right track belt assembly 110 is highly compressed near the right inner lateral edge 112 and less compressed near the right outer lateral edge 113. As the tread bars 34 are advanced in the general direction of arrow 26, the portion of the tread bar closest to the right inner lateral edge 112 separates from the crowned surface 120 first. As the right track belt assembly 110 is advanced in the general direction of arrow 26, elastic forces will pull on the tread bar 34 so as to scruff the portion of the tread bar 34 closest to the left outer lateral edge along the crowned surface 120. Since the left outer lateral edge 103 is less compressed, due to the crowned road 120, then the amount of wear is reduced due to the reduced force on this portion of the left track assembly 100.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, although the leading edge transition point 44 and the trailing edge transition point 46 are described herein as being two separate points of the first cross section of the tread bar 34, and have significant advantages thereby in the present invention, the leading edge transition point and the trailing edge transition point could be a single point.

What is claimed is:

1. A track belt assembly for a work machine which is operable to advance in a forward direction of movement, comprising:

an elastomeric track member which forms a closed loop and which is advanced in a path of movement when said work machine is advanced in said forward direction of movement; and a number of elastomeric tread bars mounted on an outer surface of said track member, wherein a first cross section of each of said number of tread bars which is taken in a longitudinal direction which is oriented parallel to said forward direction of movement defines (i) a leading terminal end point, a leading edge transition point, a trailing edge transition point, and a trailing terminal end point, wherein the distance between said track member and each point of said first cross section which is interposed between said leading terminal end point and said leading edge transition point is smaller than the distance between said track member and said leading edge transition point, wherein the distance between said track member and each point of said first cross section which is interposed between said trailing terminal end point and said trailing edge transition point is smaller than the distance between said track member and said trailing edge transition point, wherein a leading longitudinal distance LD is defined between said leading terminal end point and said leading edge transition point, wherein a trailing longitudinal distance TD is defined between said trailing terminal end point and said trailing edge transition point, wherein said leading terminal end point is located ahead of said trailing terminal end point when said track member is advanced in said path of movement, and wherein TD>2LD.

2. The track belt assembly of claim 1, wherein:
TD>4LD.

3. The track belt assembly of claim 1, wherein:
a trailing edge midpoint lies one half of the vertical distance between said trailing edge transition point and said track member and is positioned on said outer surface of said tread bar between said trailing edge transition point and said trailing terminal end point;

said trailing edge transition point and said trailing edge midpoint define a line;

said line forms an angle of $\Theta$ with said track member; and
$10<\Theta<40$.

4. The track belt assembly of claim 1, wherein:
the track member has a left lateral edge and a right lateral edge, said track member defining a midline spaced equidistant from said left lateral edge and said right lateral edge so as to define a left region and a right region thereof, said number of tread bars includes a plurality of left tread bars secured to said track member, each of said plurality of left tread bars having a left outer edge, and said left outer edge being positioned adjacent to said left lateral edge of said track member, and said number of tread bars includes a plurality of right tread bars secured to said track member, each of said plurality of right tread bars having a right outer edge, and said right outer edge being positioned adjacent to said right lateral edge of said track member, a portion of each of said plurality of left tread bars is positioned in said right region, a portion of each of said plurality of right tread bars is positioned in said left region, a majority of each of said plurality of left tread bars is positioned in said left region, and a majority of each of said plurality of right tread bars is positioned in said right region.

5. The track belt assembly of claim 4, further wherein:
a second cross section of each of said plurality of right tread bars which is taken in a first transverse direction which is perpendicular to said longitudinal direction defines (i) a right inner transition point, and (ii) a right outer transition point, and wherein the distance between said track member and each point of said second cross section which is interposed between said right inner transition point and said right outer transition point is smaller than the distance between said track member and said right inner transition point.

6. The track belt assembly of claim 5, further wherein:
a third cross section of each of said plurality of left tread bars which is taken in a second transverse direction which is perpendicular to said longitudinal direction defines (i) a left inner transition point, and (ii) a left outer transition point, and wherein the distance between said track member and each point of said third cross section which is interposed between said left inner transition point and said left outer transition point is smaller than the distance between said track member and said left inner transition point.

7. The track belt assembly of claim 1, wherein:

the track member has a first lateral edge and a second lateral edge, each of said number of tread bars has (i) a first outer edge which is positioned adjacent to said first lateral edge of said track member, and (ii) a second outer edge which is positioned adjacent to second lateral edge of said track member, and said first outer edge is located ahead of said second outer edge when said track member is advanced in said path of movement.

8. The track belt assembly of claim 7, wherein:

said first lateral edge is a left lateral edge, said second lateral edge is a right lateral edge, said first outer edge is a left outer edge, and said second outer edge is a right outer edge.

9. A work machine which is operable in a forward direction of movement, comprising:

a chassis;

an engine mounted to said chassis;

a drive wheel mounted to said chassis and mechanically coupled to said engine;

an idler wheel mounted to said chassis;

a number of rollers mounted to said chassis which supports the weight of said work machine; and a track belt assembly which includes (i) an elastomeric track member which forms a closed loop around said drive wheel, said idler wheel, and said number of rollers and which is advanced in a path of movement when said work machine is advanced in said forward direction of movement; and (ii) a number of elastomeric tread bars mounted on an outer surface of said track member, wherein a first cross section of each of said number of tread bars which is taken in a longitudinal direction which is oriented parallel to said forward direction of movement defines (i) a leading terminal end point, a leading edge transition point, a trailing edge transition point, and a trailing terminal end point, wherein the distance between said track member and each point of said first cross section which is interposed between said leading terminal end point and said leading edge transition point is smaller than the distance between said track member and said leading edge transition point, wherein the distance between said track member and each point of said first cross section which is interposed between said trailing terminal end point and said trailing edge transition point is smaller than the distance between said track member and said trailing edge transition point, wherein a leading longitudinal distance LD is defined between said leading terminal end point and said leading edge transition point, wherein a trailing longitudinal distance TD is defined between said trailing terminal end point and said trailing edge transition point, wherein said leading terminal end point is located ahead of said trailing terminal end point when said track member is advanced in said path of movement, and wherein TD>2LD.

10. The work machine of claim 9, wherein:

TD>4LD.

11. The track belt assembly of claim 9, wherein:

a trailing edge midpoint lies one half of the vertical distance between said trailing edge transition point and said track member and is positioned on said tread bar between said trailing edge transition point and said trailing terminal end point;

said trailing edge transition point and said trailing edge midpoint define a line;

said line forms an angle of Θ with said track member; and

10<Θ<40.

12. The work machine of claim 9, wherein:

the track member has a left lateral edge and a right lateral edge, said track member defining a midline spaced equidistant from said left lateral edge and said right lateral edge so as to define a left region and a right region thereof, said number of tread bars includes a plurality of left tread bars secured to said track member, each of said plurality of left tread bars having a left outer edge, and said left outer edge being positioned adjacent to said left lateral edge of said track member, said number of tread bars includes a plurality of right tread bars secured to said track member, each of said plurality of right tread bars having a right outer edge, and said right outer edge being positioned adjacent to said right lateral edge of said track member, a portion of each of said plurality of left tread bars is positioned in said right region, a portion of each of said plurality of right tread bars is positioned in said left region, a majority of each of said plurality of left tread bars is positioned in said left region, and a majority of each of said plurality of right tread bars is positioned in said right region.

13. The work machine of claim 12, further wherein:

a second cross section of each of said plurality of right tread bars which is taken in a first transverse direction which is perpendicular to said longitudinal direction defines (i) a right inner transition point, and (ii) a right outer transition point, and wherein the distance between said track member and each point of said second cross section which is interposed between said right inner transition point and said right outer transition point is smaller than the distance between said track member and said right inner transition point.

14. The work machine of claim 13, further wherein:

a third cross section of each of said plurality of left tread bars which is taken in a second transverse direction which is perpendicular to said longitudinal direction defines (i) a left inner transition point, and (ii) a left outer transition point, and wherein the distance between said track member and each point of said third cross section which is interposed between said left inner transition point and said left outer transition point is smaller than the distance between said track member and said left inner transition point.

15. The work machine of claim 9, wherein:

the track member has a first lateral edge and a second lateral edge, each of said number of tread bars has (i) a first outer edge which is positioned adjacent to said first lateral edge of said track member, and (ii) a second outer edge which is positioned adjacent to second lateral edge of said track member, and said first outer edge is located ahead of said second outer edge when said track member is advanced in said path of movement.

16. The work machine of claim 15, wherein:

said first lateral edge is a right lateral edge, said second lateral edge is a left lateral edge, said first outer edge is a right outer edge, and said second outer edge is a left outer edge.

17. A track belt assembly for a work machine which is operable to advance in a forward direction of movement, comprising:

an elastomeric track member which forms a closed loop and which is advanced in a path of movement when said work machine is advanced in said forward direction of movement; and a number of elastomeric tread bars mounted on an outer surface of said track member, wherein a first cross section of each of said number of tread bars that is taken in a longitudinal direction which is oriented parallel to said forward direction of movement defines (i) a leading terminal end point, a leading edge transition point, a trailing edge transition point, and a trailing terminal end point, wherein the distance between said track member and each point of said first cross section which is interposed between said leading terminal end point and said leading edge transition point is smaller than the distance between said track member and said leading edge transition point, wherein the distance between said track member and each point of said first cross section which is interposed between said trailing terminal end point and said trailing edge transition point is smaller than the distance between said track member and said trailing edge transition point, wherein a leading longitudinal distance LD is defined between said leading terminal end point and said leading edge transition point, wherein a trailing longitudinal distance TD is defined between said trailing terminal end point and said trailing edge transition point, wherein said leading terminal end point is located ahead of said trailing terminal end point when said track member is advanced in said path of movement, wherein TD>4LD, wherein the track member has a first lateral edge and a second lateral edge, wherein each of said number of tread bars has (i) a first outer edge which is positioned adjacent to said first lateral edge of said track member, and (ii) a second outer edge which is positioned adjacent to second lateral edge of said track member, and wherein said first outer edge is located ahead of said second outer edge when said track member is advanced in said path of movement.

18. The track belt assembly of claim 17, herein:

said first lateral edge is a left lateral edge, said second lateral edge is a right lateral edge, said first outer edge is a left outer edge, and said second outer edge is a right outer edge.

19. The track belt assembly of claim 17, wherein:

said first lateral edge is a right lateral edge, said second lateral edge is a left lateral edge, said first outer edge is a right outer edge, and said second outer edge is a left outer edge.

20. The track belt assembly of claim 17, wherein:

the track member has a left lateral edge and a right lateral edge, said track member defining a midline spaced equidistant from said left lateral edge and said right lateral edge so as to define a left region and a right region thereof, said number of tread bars includes a plurality of left tread bars secured to said track member, each of said plurality of left tread bars having a left outer edge, and said left outer edge being positioned adjacent to said left lateral edge of said track member, said number of tread bars includes a plurality of right tread bars secured to said track member, each of said plurality of right tread bars having a right outer edge, and said right outer edge being positioned adjacent to said right lateral edge of said track member, a portion of each of said plurality of left tread bars is positioned in said right region, a portion of each of said plurality of right tread bars is positioned in said left region, a majority of each of said plurality of left tread bars is positioned in said left region, and a majority of each of said plurality of right tread bars is positioned in said right region.

* * * * *